Patented Mar. 11, 1952

2,589,166

UNITED STATES PATENT OFFICE 2,589,166

KETONE SOLUBLE COPOLYMER OF METHACRYLONITRILE AND A DIOLEFIN

Byron M. Vanderbilt, Westfield, N. J., and Frances Bascom, Staten Island, N. Y., assignors to Standard Oil Development Company, a corporation of Delaware No Drawing. Application December 31, 1946, Serial No. 719,618

8 Claims. (Cl. 260—32.8)

1

This invention pertains to certain oil-resistant resins and to a process of preparing the same. More particularly, the invention pertains to oil-resistant copolymers of methacrylonitrile and a conjugated diolefin of less than seven carbon atoms.

It is well known that synthetic rubber-like materials can be prepared by copolymerizing, preferably in aqueous emulsion, a mixture of a major proportion of a conjugated diolefin such as butadiene, isoprene, piperylene, dimethylbutadiene and the like and a minor proportion of an acrylonitrile such as acrylonitrile per se, methacrylonitrile, chloroacrylonitrile, etc. It has also been disclosed in U. S. Patent 2,374,841 that tough, flexible, leather-like and exceedingly solvent resistant copolymers can be prepared if an acrylic nitrile is mixed with a lesser amount by weight of a conjugated diene and the mixture polymerized. It is indicated in said patent that only copolymers prepared from mixtures containing relatively large proportions of diene, say 40%, may be mixed with sulfur and vulcanized as in the manner of rubber-like materials to form products of increased strength.

The polymerization described in Example 2 of U. S. Patent 2,374,841 was carried out as follows. Pressure bottles were charged with:

| | Parts |
|---|---|
| Water | 250 |
| Tallow acid soap (100% neutralized) | 3.75 |
| Hydrogen peroxide | 0.3 |
| Acrylonitrile | 75 |
| Butadiene-1,3 | 25 |

The bottles were agitated and maintained at a temperature of 40° C. for 72 hours. A yield of 61.5 parts of polymer was obtained. The product was hard, horny and would not band on a 3″ x 5″ mill at temperatures of 150–175° F. When higher mill temperatures were applied, the polymer became rougher and holes formed in the sheet.

When this experiment was repeated using methacrylonitrile instead of acrylonitrile as proposed in Example 3 of the said patent, no polymer was formed after 72 hours at 40° C.

It is the object of this invention to prepare certain new copolymers of certain conjugated diolefins and certain nitriles.

It is also the object of this invention to prepare certain diene-nitrile copolymers which are thermoplastic, capable of vulcanization and which possess high resistance to the action of solvents.

These and other objects will appear more clearly from the detailed specification and claims which follow.

2

We have now found that new, vulcanizable products, possessing outstanding thermoplastic properties may be obtained if methacrylonitrile is copolymerized with a diolefin or a mixture of diolefins containing a major proportion of butadiene and a minor proportion of isoprene or dimethyl butadiene, provided that the methacrylonitrile constitutes from 60–80 wt. per cent of the reactant mixture and the polymerization is conducted in aqueous emulsion and in the presence of an aliphatic mercaptan polymerization modifier, preferably dodecyl mercaptan or commercial mercaptan mixtures such as "Lorol" mercaptan containing more than 50% of dodecyl mercaptan.

Methacrylonitrile may be copolymerized in accordance with the present invention with a conjugated diene of from 4 to 6 carbon atoms per molecule in the ratio of 60 to 80 wt. per cent of methacrylonitrile with 40 to 20 wt. per cent of diene. Butadiene-1,3 itself is preferred although isoprene, 2,3-dimethyl butadiene, 2-methyl pentadiene and the like also give valuable products. Isoprene is a likely substitute for butadiene while dimethyl butadiene copolymerizes more slowly with methacrylonitrile to give less thermoplastic resins than are obtained with butadiene. Mixtures of diolefins, particularly those containing a major proportion of butadiene and a minor proportion of isoprene, piperylene or dimethyl butadiene, may also be used. It is preferred to copolymerize 62–67 wt. per cent of methacrylonitrile with 38–33 wt. per cent of butadiene-1,3 or isoprene, a more uniform product being obtainable if the diene is added in several increments during the polymerization rather than all at one time. Products of the desired properties are obtainable only with methacrylonitrile, acrylonitrile giving a hard, brittle resin which can be banded on a mill only when the mill is heated to about 300° F.

In order to produce resins of the desired properties it is necessary to utilize an alkali metal or ammonium persulfate or perborate polymerization catalyst and a mercaptan polymerization modifier in the reaction system. The mercaptan should be aliphatic in nature and contain between 8 and 14 carbon atoms. Suitable mercaptans are diisobutyl mercaptan, decyl mercaptan, dodecyl mercaptan and "Lorol" mercaptan which is prepared from "Lorol," a commercial alcohol mixture containing about 50–75% $C_{12}$, less than 15% of $C_{10}$, 15–35% of $C_{14}$ and less than 20% of $C_{16}$, $C_{18}$ or higher alcohols.

The polymerization catalysts such as sodium perborate, potassium persulfate and the like are used in amounts of from about 0.1% to about 1.0% based upon the monomers. The quantity of mercaptan employed is preferably between 0.2 and 1.0 part per 100 parts of monomer although as much as 5 parts can be added if very soft resins are desired.

The resinous copolymers of methacrylonitrile and butadiene or isoprene may be modified by copolymerizing a third component such as acrylonitrile, styrene, substituted styrenes such as alpha methyl styrene, paramethyl styrene, alpha methyl paramethyl styrene, chlorostyrenes, unsaturated esters such as methyl acrylate, methyl methacrylate, ethyl fumarate, and unsaturated ketones such as methyl vinyl ketone, methyl isopropenyl ketone and the like. These terpolymers should contain at least 50% methacrylonitrile, at least 20% diolefin and between 10 and 30% of one of the third components described above.

The methacrylonitrile copolymers produced in accordance with the present invention are valuable in protective coatings, in the impregnation of paper, cloth, wood, etc., in the formation of self-sustaining films or sheets, as processing aids for plastics such as natural rubber, the Buna rubbers, neoprene, Thiokol, Butyl rubber, polyvinyls, polyvinyl chloride, polyvinyl acetate, or copolymers thereof, polyvinylidene chloride, polystyrene, cellulose esters and ethers, chlorinated rubber-like materials and also as blending agents for natural gums, mineral and vegetable waxes, shellac and the like to lend oil resistance as well as stiffness to said compositions.

The methacrylonitrile copolymers can be chlorinated, nitrated and the like to give valuable products. The said copolymers can be vulcanized with sulfur in the presence of suitable accelerating agents. Other vulcanizing agents such as dinitrosobenzene, quinone dioxime and the like may also be employed.

The methacylonitrile copolymer resins may also be solubilized by reaction with acids, mercaptans, etc., and used as additives for mineral oils.

In order to illustrate our invention more fully, the following examples are given. The parts are by weight.

Example 1

Pressure bottles were charged with:

| | Parts |
|---|---|
| Water | 250 |
| Tallow acid soap (100% neutralized) | 3.75 |
| Potassium persulfate | 0.3 |
| Lorol mercaptan | 0.5 |
| Methacrylonitrile | 75.0 |
| Butadiene | 25.0 |

The bottles were agitated and maintained at a temperature of 40° C. for 72 hours. Coagulation of the resultant latex with brine and alcohol and washing on a mill gave 81 parts of copolymer which was a clear thermoplastic resin. The plastic copolymer gave an excellent band and sheet when milled at 150–175° F.

This experiment was repeated substituting 75 parts of acrylonitrile in place of the methacrylonitrile with all other conditions the same. In this case the yield of polymer amounted to 100 parts. The product was a powder which formed a band on a mill heated to approximately 300° F. The milled resin was hard and very brittle when cooled, showing that acrylonitrile is incapable of giving copolymer resins possessing the characteristics of the methacrylonitrile copolymer resins.

Example 2

The following mixture was heated at 35° C. for 17½ hours while mixing:

| | Parts |
|---|---|
| Methacrylonitrile | 150 |
| Butadiene | 50 |
| Water | 400 |
| Soap (80% neutralized) | 8 |
| Potassium persulfate | 0.6 |
| Lorol mercaptan | 1.0 |
| Morpholine | 0.3 |

The resultant latex was coagulated with brine and alcohol and washed on a mill to give 154 parts of a clear thermoplastic resin.

This resin was dissolved in methyl ethyl ketone to form a fluid solution containing 8% of the copolymer. When this solution was applied to a steel panel containing a base coating of iron oxide, a clear adherent coating was formed which was not appreciably affected when immersed alternately into gasoline and into water. Instead of separating the polymer and dissolving the polymer in methyl ethyl ketone, the latex may be applied directly or after creaming to such surfaces to form highly resistant coatings.

Example 3

Example 2 was repeated except that isoprene was substituted for the butadiene. Yield in this case at the end of 19 hours at 35° C. was 120 parts and the product was more plastic at room temperature than was the butadiene product.

Example 4

The following mixture was heated at 40° C. for 17 hours:

| | Parts |
|---|---|
| Methacrylonitrile | 75 |
| Butadiene | 25 |
| Water | 200 |
| Soap (80% neutralized) | 4 |
| Potassium persulfate | 0.3 |
| Lorol mercaptan | 0.5 |
| Morpholine | 0.3 |

The resultant latex was coagulated and the product washed and dried. Yield was 68.5 parts of resin.

The copolymer formed was compounded on a rubber mill at 200° F. according to the following recipe:

| | Parts |
|---|---|
| Resin copolymer | 100 |
| Semi-reinforcing furnace black | 75 |
| Stearic acid | 1.5 |
| Zinc oxide | 5 |
| Benzothiazyl disulfide | 1 |
| Sulfur | 1.5 |

Cures were obtained at 287° F. The vulcanizates were somewhat thermoplastic, resembling hard rubber at room temperature, but softening at temperatures above about 125° F. Evaluation data:

| Cure Time at 287° F. | Tensile p. s. i. | Per cent Elongation | Shore Hardness | Per cent Swell Aromatic Gasoline [1] |
|---|---|---|---|---|
| Minutes | | | | |
| 30 | 4,040 | 60 | 90 | 8.2 |
| 60 | 4,070 | 55 | 100 | 7.0 |
| 90 | 4,465 | 35 | 96 | 7.8 |
| 120 | 4,605 | 20 | 95 | 8.6 |

[1] 48 hours at room temperature.

Apparently vulcanization takes place as shown by the decreasing elongation with time of cure. The swelling in aromatic gasoline changes little with time of cure, but is so low in all cases that it is of little significance. A 75% butadiene-25% acrylonitrile copolymer with a like loading and 60′ cure would swell about 60%.

*Example 5*

Example 4 was repeated but 0.5 part of hexadecyl mercaptan was substituted for the 0.5 part of commercial Lorol mercaptan. A conversion of 65½% was obtained after 17 hours at 45° C. However, the product formed did not soften sufficiently at 200° F. on a mill so that it could be sheeted into a smooth sheet, showing that it is necessary to use lower molecular weight (i. e. 8, 10, 12 or 14 C-atom) mercaptans in the formation of copolymers of the desired thermoplasticity.

*Example 6*

The following run was made using a 70/30 ratio of methacrylonitrile-butadiene and 2,000 grams of total reactants. Initial charge:

|  | Parts |
|---|---|
| Tallow acids | 70 |
| 1.02N NaOH | 215 |
| Water | 3,785 |
| Methacrylonitrile | 1,400 |
| Butadiene | 300 |
| Potassium persulfate | 6 |
| Commercial dodecyl mercaptan | 5 |
| Morpholine | 6 |

The reaction was carried out at 40° C.

During the synthesis, the following additions were made:

At 20% conversion—2.5 parts of mercaptan and 94 parts of butadiene
At 40% conversion—2.5 parts mercaptan and 106 parts of butadiene
At 60% conversion—100 parts of butadiene The product obtained at 88% conversion was a plastic solid and contained 65% of combined methacrylonitrile. It sheeted out on a rubber mill to give a nearly colorless transparent film resembling plasticized polyvinyl chloride. Atmospheric exposure tests indicated the copolymer to be quite stable to light and atmospheric conditions in general.

*Example 7*

Example 6 was repeated except that potassium oleate was used as the emulsifier. It was found that the latex obtained could be creamed to 52% solids by adding a destabilizer and a creaming agent as described in U. S. Patent 2,444,801.

*Example 8*

Three runs were carried out in pressure bottles using the following three proportions of methacrylonitrile and butadiene:

(1) 75/25
(2) 85/15
(3) 95/5

Other ingredients were as Example 6. The following reaction times were employed at 38° C., resulting in the following yields:

(1) 17 hours _____ per cent yield__ 73
(2) 21 hours _____ per cent yield__ 53
(3) 63 hours _____ per cent yield__ 30

It is obvious that, especially in runs 2 and 3, the butadiene reacts selectively and the reaction stops at a relatively low conversion due to the slow reaction rate of methacrylonitrile to form polymethacrylonitrile. The copolymer from run 3 was too brittle to be of interest.

*Example 9*

Example 8 was repeated using 75/25 and 80/20 ratios of reactants. After 17 hours at 39–40° C., the former was 68½% converted and the latter 56%. The product from the 75/25 feed contained 62.3% combined methacrylonitrile; that from the 80/20 feed, 65.7%. Both of these products were quite pliable, resembling plasticized polyvinyl chloride in appearance. They were completely soluble in methyl ethyl ketone, but both were incompletely soluble in benzene.

The foregoing description contains a limited number of embodiments of the present invention. It will be understood, however, that numerous variations are possible without departing from the scope of the following claims.

What we claim and desire to secure by Letters Patent is:

1. A coating composition comprising a fluid solution of a thermoplastic resin prepared by copolymerization in aqueous emulsion of a mixture of monomers consisting of 60 to 80 parts by weight of methacrylonitrile and 40 to 20 parts by weight of a conjugated diolefin of 4 to 6 carbon atoms in the presence of 0.1 to 1.0 weight percent of an oxygen yielding copolymerization catalyst and 0.1 to 5.0 parts by weight of an aliphatic mercaptan of 8 to 14 carbon atoms, said resin being dissolved in a solvent consisting of methyl ethyl ketone.

2. A coating composition comprising a fluid solution of a thermoplastic resin prepared by copolymerization in aqueous emulsion of a mixture of monomers consisting of 63 to 67 weight percent of methacrylonitrile and 37 to 33 weight percent of butadiene-1,3 in the presence of 0.1 to 1.0 weight percent of potassium persulfate and 0.2 to 1.0 weight percent of an aliphatic mercaptan of 8 to 14 carbon atoms at a temperature between 35 and 45° C., said resin being dissolved in a solvent consisting of methyl ethyl ketone.

3. As an article of manufacture, a solid base covered with a permanent adherent protective coating of a hard, thermoplastic resin prepared by copolymerization in aqueous emulsion of a mixture of monomers consisting of 60 to 80 parts by weight of methacrylonitrile and 40 to 20 parts by weight of a conjugated diolefin of 4 to 6 carbon atoms in the presence of 0.1 to 1.0 weight percent of an alkali persulfate polymerization catalyst and 0.1 to 1.0 part by weight of an aliphatic mercaptan of 8 to 14 carbon atoms.

4. As an article of manufacture, a steel base covered with a permanent adherent protective coating consisting essentially of a hard, thermoplastic resin prepared by heating an aqueous emulsion of a mixture of monomers consisting of 60 to 80 parts by weight of methacrylonitrile and 40 to 20 parts by weight of butadiene-1,3 in the presence of about 0.3 weight percent of potassium persulfate and about 0.5 part by weight of an aliphatic mercaptan of 8 to 14 carbon atoms at a temperature of about 35° C.

5. A coating composition comprising a fluid solution of a thermoplastic resin prepared by copolymerization in aqueous emulsion of a mixture of monomers consisting of about 75 parts by weight of methacrylonitrile and about 25 parts by weight of a conjugated diolefin of 4 to 6 carbon atoms in the presence of 0.1 to 1.0 weight per cent of potassium persulfate and 0.2 to 1.0 weight per cent of an aliphatic mercaptan of 8 to 14 carbon atoms at a temperature of about 35° C., said resin being dissolved in a solvent consisting of methyl ethyl ketone.

6. A coating composition comprising a fluid solution of a thermoplastic resin prepared by copolymerization in aqueous emulsion of a mixture of monomers consisting of about 75 parts by weight of methacrylonitrile and about 25 parts by weight of isoprene in the presence of about 0.6 weight per cent of potassium persulfate and about 1.0 part by weight of an aliphatic mercaptan of 8 to 14 carbon atoms, said resin being dissolved in a solvent consisting of methyl ethyl ketone.

7. As an article of manufacture, a solid base covered with a permanent adherent protective coating of a hard, thermoplastic resin prepared by copolymerization in aqueous emulsion of a mixture of monomers consisting of 63 to 67 weight per cent of methacrylonitrile and 37 to 33 weight per cent of butadiene-1,3 in the presence of 0.1 to 1.0 weight per cent of potassium persulfate and 0.2 to 1.0 weight per cent of an aliphatic mercaptan of 8 to 14 carbon atoms at a temperature between 35 and 45° C.

8. As an article of manufacture, a solid base covered with a permanent adherent protective coating of a hard thermoplastic resin prepared by copolymerization in aqueous emulsion of a mixture of monomers consisting of about 75 parts by weight of methacrylonitrile and about 25 parts by weight of butadiene-1,3 in the presence of 0.1 to 1.0 weight per cent of potassium persulfate and 0.1 to 1.0 part by weight of an aliphatic mercaptan of 8 to 14 carbon atoms at a temperature of about 35° C.

BYRON M. VANDERBILT.
FRANCES BASCOM.

REFERENCES CITED

The following references are of record in the file of this patent:

UNITED STATES PATENTS

| Number | Name | Date |
|---|---|---|
| 2,281,613 | Wollthan et al. | May 5, 1942 |
| 2,374,841 | Semon | May 1, 1945 |
| 2,380,905 | Stewart | July 31, 1945 |
| 2,393,206 | Vanderbilt | Jan. 15, 1946 |
| 2,425,086 | D'Alelio | Aug. 5, 1947 |
| 2,437,421 | D'Alelio | Mar. 9, 1948 |